United States Patent
Takehana et al.

(10) Patent No.: US 12,289,043 B2
(45) Date of Patent: Apr. 29, 2025

(54) INSULATED POWER SUPPLY APPARATUS

(71) Applicants: Hiroaki Takehana, Sagamihara (JP); Takumi Hyugaji, Isehara (JP)

(72) Inventors: Hiroaki Takehana, Sagamihara (JP); Takumi Hyugaji, Isehara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 211 days.

(21) Appl. No.: 18/068,549

(22) Filed: Dec. 20, 2022

(65) Prior Publication Data
US 2023/0198370 A1    Jun. 22, 2023

(30) Foreign Application Priority Data
Dec. 22, 2021 (JP) .................. 2021-207662

(51) Int. Cl.
*H02M 1/08* (2006.01)
*H02M 1/00* (2006.01)

(52) U.S. Cl.
CPC ......... *H02M 1/0058* (2021.05); *H02M 1/083* (2013.01)

(58) Field of Classification Search
CPC .... H02M 1/058; H02M 1/083; H02M 1/0048; H02M 1/082
See application file for complete search history.

(56) References Cited

U.S. PATENT DOCUMENTS

| | | | |
|---|---|---|---|
| 2012/0262961 A1* | 10/2012 | Chien | H02M 3/33507 363/84 |
| 2018/0301975 A1* | 10/2018 | Lin | H02M 3/33569 |
| 2020/0091827 A1* | 3/2020 | Chen | H02M 3/33569 |

FOREIGN PATENT DOCUMENTS

| | | |
|---|---|---|
| JP | 2006325325 A | 11/2006 |
| JP | 2013201829 A | 10/2013 |
| JP | 2017112797 A | 6/2017 |
| JP | 2020058166 A | 4/2020 |

* cited by examiner

*Primary Examiner* — Nguyen Tran
(74) *Attorney, Agent, or Firm* — Shih IP Law Group, PLLC (57) ABSTRACT

An insulated power supply apparatus includes, a transformer; a switching element connected in series with a primary side winding of the transformer; an active clamp circuit connected between terminals of the primary side winding of the transformer; and a power supply control semiconductor device. The switching element includes a field effect transistor and a current-voltage conversion element is connected between a source terminal of the switching element and a grounding point. The power supply control semiconductor device includes the following, a first external terminal in which voltage according to a drain side of the switching element is input, a second external terminal in which voltage converted by the current-voltage conversion element is input, an on/off control circuit that performs turn-on and turn-off of the switching element, and a ZVS determining circuit that determines whether zero voltage switching control is performed.

6 Claims, 7 Drawing Sheets

INSULATED POWER SUPPLY APPARATUS

REFERENCE TO RELATED APPLICATIONS

This application is based upon and claims the benefit of priority from the prior Japanese Patent Application No. 2021-207662, filed on Dec. 22, 2021, the entire contents of which are incorporated herein by reference.

TECHNICAL FIELD

The present invention relates to an insulated power supply apparatus including a power supply controlling semiconductor device that controls a switching element connected in series with a primary side winding of a voltage conversion transformer.

DESCRIPTION OF RELATED ART

Conventionally, as a switching power supply apparatus, there is a switching power supply apparatus (insulated DC-DC converter) that includes a transistor (in addition to a silicon substrate, including a transistor on a GaN or SiC substrate) as a switching element in order to flow an electric current intermittently in a primary side coil of a transformer and a control circuit (IC) that controls on and off of the switching element. In such switching power supply apparatus, by flowing electric current in the primary side coil, the electric current induced in the secondary side coil is rectified by the diode. The electric current is smoothed in the capacitor and output.

Examples of direct current power supply apparatuses include a diode bridge circuit that rectifies an alternating power supply and an insulated AC-DC converter that steps down the direct current voltage rectified in the circuit with the switching power supply apparatus (insulated DC-DC convertor) and converts the voltage to a direct current voltage with a desired potential.

In such insulated AC-DC convertor, there is a switching method called soft switching in which a switching element is turned on and off after voltage applied to the switching element becomes 0V or the conducted electric current becomes 0 A using high frequency resonance. The method to perform switching at a timing when the voltage becomes zero is called zero voltage switching. Compared to a switching method called hard switching in which direct current power supply voltage is directly cut or conducted, soft switching is attracting attention because it is expected to reduce switching losses and electromagnetic interference (EMI) noise. For example, JP 2017-112797 describes an invention regarding zero voltage switching.

Insulated AC-DC convertors and insulated DC-DC convertors that include a transformer may be provided with an active clamp circuit including an energy regenerating function on a primary winding side of the transformer in order to enhance efficiency.

Inventions regarding the switching power supply apparatus provided with the active clamp circuit are described in JP 2006-325325 and JP 2013-201829.

According to the insulated AC-DC convertor including the active clamp circuit and employing the zero voltage switching control method (hereinafter referred to as ZVS), when the switching element (main FET) turns on, the charge accumulated in a capacitance component of a drain terminal of the main FET is discharged. The amount of discharged charge is in proportion with a drain voltage. As the on and off by the ZVS control become more shifted from the optimum timing, the larger the amount of discharged charge becomes. With this, the noise is generated when the accumulated charge is discharged. Moreover, conversion efficiency of the power supply apparatus is reduced due to the unnecessary loss of energy. Such problems became clear from the consideration by the inventors.

Moreover, the following problems occur when the drain voltage of the switching element is directly monitored and it is determined whether the ZVS control is performed.
(1) Since the drain voltage rises to several hundred V, it is necessary to provide a high voltage resistance element with a large size in the detector.
(2) A low voltage resistance element can be used if the voltage is divided by resistors, but flowing electric current to voltage dividing circuits leads to increase in loss.
(3) The electric current can be decreased if impedance of the voltage dividing circuit is high, but a time constant of the filter formed with the voltage dividing circuit and an input capacitance of the terminal becomes high. Therefore, the waveform is corrupted, and is shifted from the optimum ZVS timing.

SUMMARY OF THE INVENTION

The present invention is conceived in view of the above problems, and the purpose of the present invention is to be able to easily determine whether ZVS control is performed without directly monitoring drain voltage in a zero voltage switching control type insulated power supply apparatus provided with an active clamp circuit.

In order to achieve the above object, according to one aspect, an insulated power supply apparatus includes: a transformer that converts voltage; a switching element connected in series with a primary side winding of the transformer; an active clamp circuit connected between terminals of the primary side winding of the transformer; and a power supply control semiconductor device that controls the switching element and the active clamp circuit, wherein the switching element includes a field effect transistor and a current-voltage conversion element is connected between a source terminal of the switching element and a grounding point, and wherein the power supply control semiconductor device includes, a first external terminal in which voltage according to a drain side of the switching element or a voltage dividing the voltage according to the drain side of the switching element is input, a second external terminal in which voltage converted by the current-voltage conversion element is input, an on/off control circuit that performs turn-on and turn-off of the switching element based on input voltage of the first external terminal, and a ZVS determining circuit that determines whether zero voltage switching control is performed by determining a drain side voltage of the switching element is zero voltage based on input voltage of the second external terminal.

In order to achieve the above object, according to another aspect, an insulated power supply apparatus includes: a transformer that converts voltage; a switching element connected in series with a primary side winding of the transformer; an active clamp circuit connected between terminals of the primary side winding of the transformer; and a power supply control semiconductor device that controls the switching element and the active clamp circuit, wherein the switching element includes a field effect transistor and a current-voltage conversion element is connected between a source terminal of the switching element and a grounding point, wherein the power supply control semiconductor device includes, a first external terminal in which voltage according to a drain side of the switching element or a voltage dividing the voltage according to the drain side of the switching element is input, a second external terminal in which voltage converted by the current-voltage conversion element is input, an on/off control circuit that performs turn-on and turn-off of the switching element based on input voltage of the first external terminal, and a signal generating circuit that generates a control signal that controls on and off of a transistor included in the active clamp circuit, and wherein when the transistor is turned off and the drain voltage of the switching element falls, the signal generating circuit generates the control signal to make a bottom value of an inductor current which is smaller than zero to be even smaller, the inductor current being the inductor current of the primary side winding of the transformer.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, preferable embodiments of the present invention are described below with reference to the drawings.

Figure 1:
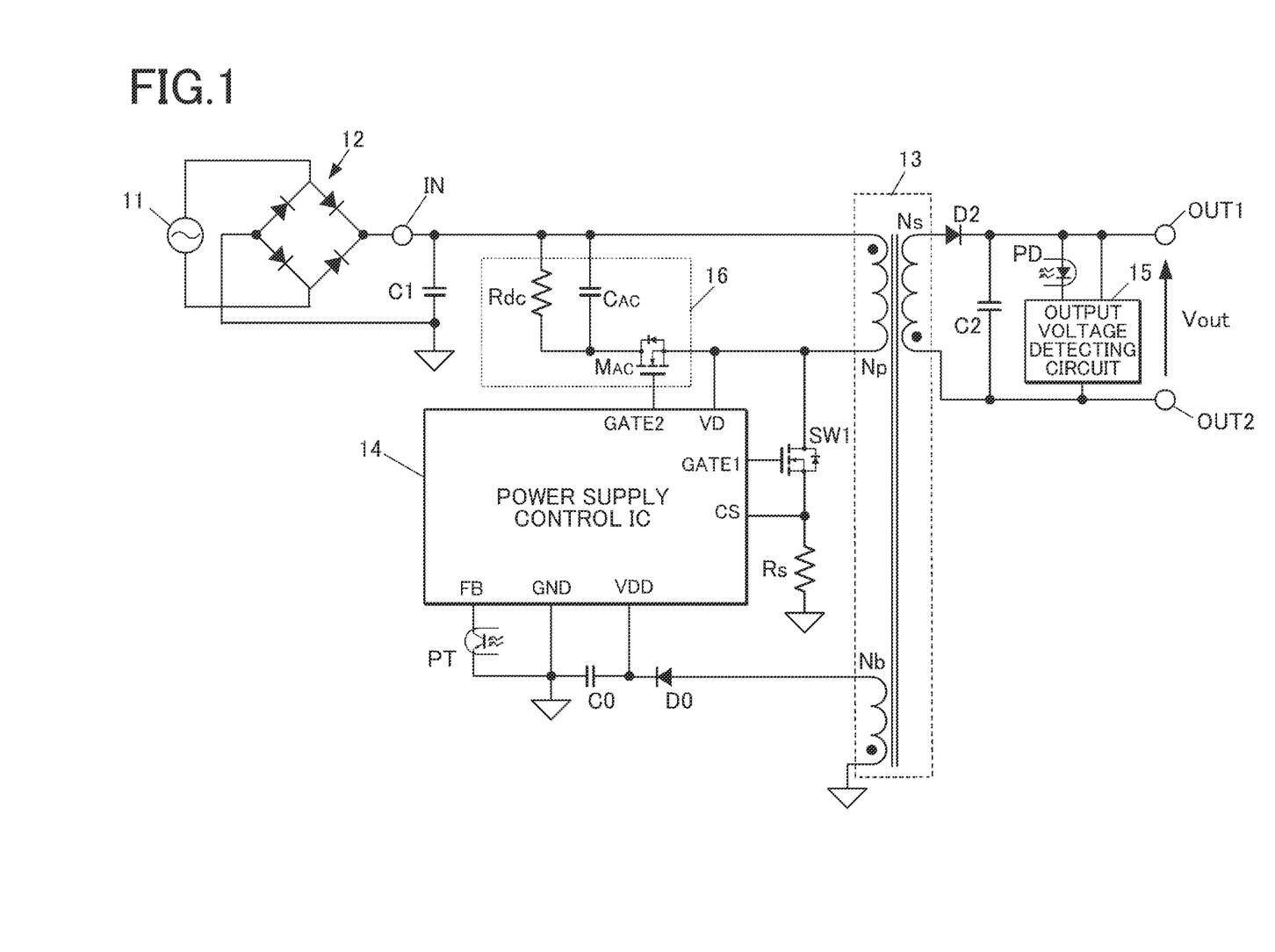
FIG. 1 is a circuit configuration diagram showing one embodiment of an AC-DC convertor as an insulated power supply apparatus according to the present invention.

FIG. 1 is a circuit configuration diagram showing one embodiment of an AC-DC convertor as an insulated power supply apparatus using a power supply control semiconductor device according to the present invention.

The AC-DC convertor according to the present embodiment is a fly back type convertor. The AC-DC convertor includes, a diode bridge circuit 12 and a smoothing capacitor C1 that rectifies AC voltage from an AC power supply 11, a transformer 13 for converting voltage that includes a primary side winding Np, a secondary side winding Ns and an auxiliary winding Nb and that is connected to a voltage input terminal IN, a switching transistor SW1 that is connected in series with the primary side winding Np of the transformer 13, and a power supply control semiconductor device which drives on and off of the switching transistor SW1 (hereinafter referred to as power supply control IC) 14.

A rectifying diode D2 connected in series with the secondary side winding Ns, and a smoothing capacitor C2 connected between a cathode terminal of the diode D2 and the other terminal of the secondary side winding Ns are provided on the secondary side of the transformer 13. By intermittently flowing the current in the primary side winding Np, the AC voltage induced in the secondary side winding Ns is rectified and smoothed. With this, DC output voltage Vout is generated and output from output terminals OUT 1 and OUT 2.

Moreover, an output voltage detecting circuit 15 that includes a shunt regulator provided with an error amplifier and that detects the output voltage Vout, and a photo diode PD that is included in a photocoupler that transmits an output voltage detecting signal according to the detected voltage to the primary side are provided on a secondary side of the transformer 13.

A phototransistor PT that constitutes the photocoupler with the photo diode PD is provided in the primary side of the transformer 13, and an external terminal FB in which the phototransistor PT is connected is provided in the power supply control IC 14. That is, an electric current according to the voltage detected by the output voltage detecting circuit 15 flows through the photodiode PD and the electric current is transmitted to the primary side as an optical signal including strength according to the detected voltage. With this, the electric current according to the optical strength flows through the phototransistor PT. This electric current is converted to the voltage VFB with the pull up resistor (Rp in FIG. 2) in the power supply control IC 14 and is transmitted.

In the AC-DC convertor according to the present embodiment, the higher the output voltage Vout on the secondary side is, the current that flows in the photo diode D and the current that flows in the photo transistor PT increase, and the voltage VFB of the external terminal FB of the power supply control IC 14 decreases.

The power supply control IC 14 is provided with an external terminal CS as an electric current detecting terminal in which voltage VCS is input. The voltage VCS is a result of current-voltage conversion by the current detecting resistor Rs connected between the source terminal of the switching transistor SW1 and the grounding point.

According to the present embodiment, an active clamp circuit 16 is provided. The active clamp circuit 16 includes a transistor MAC and a capacitor CAC which are connected in series between a low side terminal of the primary side winding Np of the transformer 13 and the voltage input terminal IN. An active clamp control circuit that controls the transistor MAC of the active clamp circuit 16 is included inside the power supply control IC 14. Although not limited, a discharging resistor Rdc is connected in parallel to the capacitor CAC in order to discharge the charge of the capacitor CAC.

A rectifying smoothing circuit is provided in the DC-DC convertor according to the present embodiment. The smoothing rectifying circuit includes a rectifying diode D0 connected in series with the auxiliary winding Nb of the transformer 13 and the smoothing capacitor C0 connected between the cathode terminal of the diode D0 and the grounding point. The voltage rectified and smoothed in the rectifying smoothing circuit is applied to the power supply voltage terminal VDD of the power supply control IC 14.

According to the present embodiment, the switching transistor SW1 and the active clamp transistor MAC are configured as discrete components by N-channel MOSFET (insulated gate type field effect transistor).

The power supply control IC 14 includes an external terminal GATE 1 that outputs a signal to drive the gate terminal of the transistor SW1, an external terminal GATE 2 that outputs a signal to drive the gate terminal of the transistor MAC, and an external terminal VD in which the drain voltage of the transistor SW1 is input. The drain voltage of the transistor SW1 can be input in the external terminal VD as the voltage divided by an external resistor.

First Example

Figure 2:
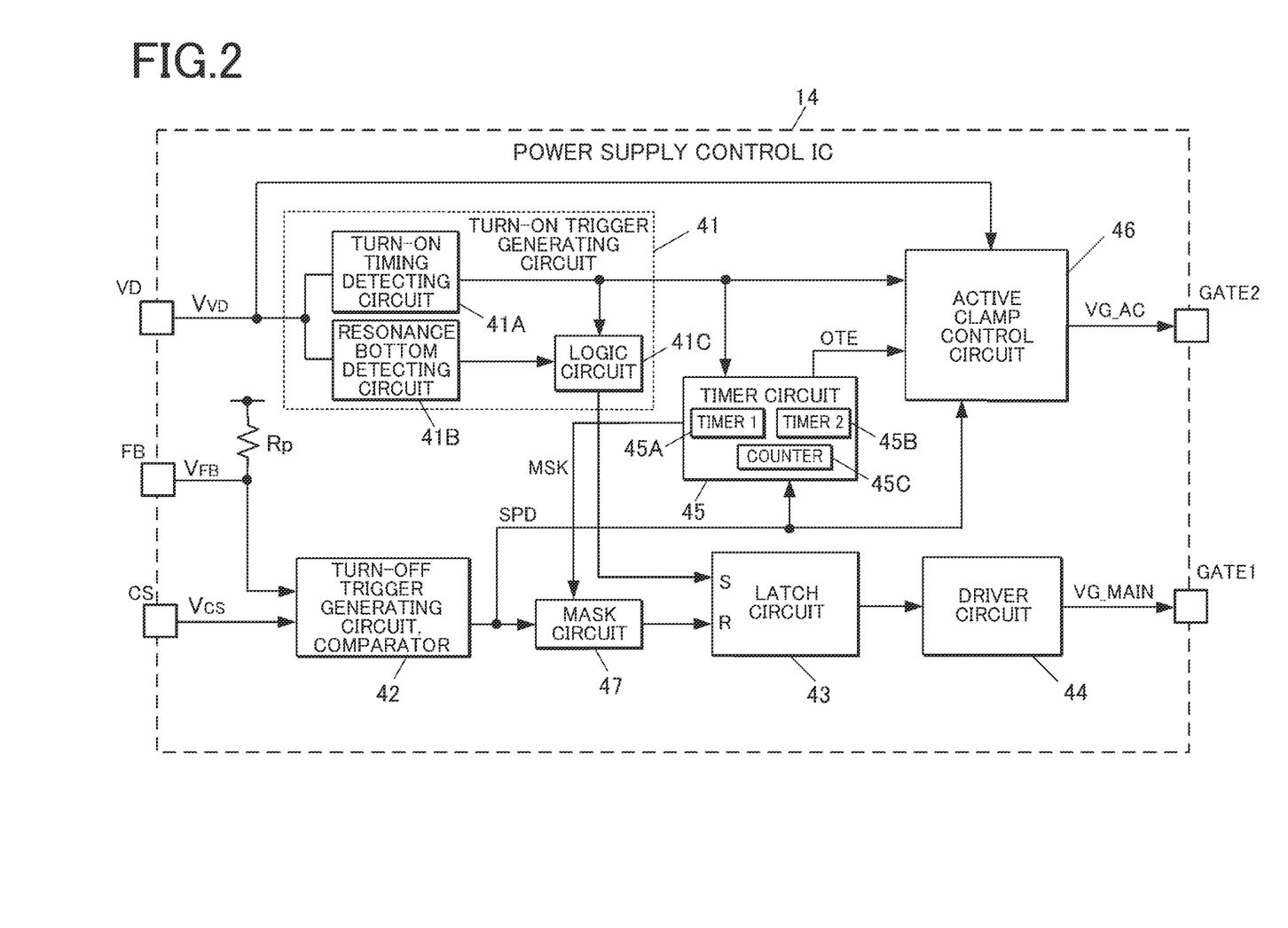
FIG. 2 is a circuit configuration diagram showing a first embodiment of a power supply control semiconductor device that controls a switching element provided in a primary side of a transformer in the AC-DC convertor shown in FIG. 1.

FIG. 2 shows a circuit configuration of a first example of the above-described power supply control IC 14.

As shown in FIG. 2, the power supply control IC 14 according to the present example includes a turn-on trigger generating circuit 41 that monitors the voltage VVD of the external terminal VD into which the drain voltage of the switching transistor SW1 is input and generates a turn-on signal of the transistor SW1 and a turn-off trigger generating circuit 42 that includes a comparator that compares the voltage VCS of the current detecting terminal CS with the predetermined reference voltage (for example, voltage VFB of the feedback terminal FB) and that generates a turn-off signal of the transistor SW1.

The power supply control IC 14 includes a latch circuit 43, a driver circuit 44, a timer circuit 45, and an active clamp control circuit 46. The latch circuit 43 includes an RS flip-flop in which output of the turn-on trigger generating circuit 41 and the output of the turn-off trigger generating circuit 42 aref1 input. The driver circuit 44 generates a gate driving signal VG_MAIN that drives the switching transistor SW1 according to the output of the latch circuit 43 and outputs the signal from the external terminal GATE1. The active clamp control circuit 46 generates the signal VG_AC that drives the gate terminal of the active clamp transistor MAC and outputs the signal from the external terminal GATE2. The latch circuit 43 and the driver circuit 44 function as the driving signal generating circuit that generates the driving signal of the switching transistor SW1. Although not shown, a driver circuit similar to the driver circuit 44 is also provided in the active clamp control circuit 46.

The above-described turn-on trigger generating circuit 41 includes a turn-on timing detecting circuit 41A, a resonance bottom detecting circuit 41B, and a logic circuit 41C. The turn-on timing detecting circuit 41A includes a comparator that detects that "the drain voltage VVD of the SW1 input to the external terminal VD is equal to or less than a predetermined threshold" or "a predetermined term elapsed in a state being not on (when zero voltage is not reached during a burst)". The resonance bottom detecting circuit 41B detects a resonance bottom of the drain voltage VVD. The logic circuit 41C includes an OR gate which implements logical disjunction of a signal detected by the detecting circuits 41A and 41B.

In this specification, the above control in which it is detected that the VVD is equal to or lower than a predetermined threshold and the SW1 is turned on is referred to as ZVS (zero voltage switching) control.

Instead of the circuit 41B that detects the resonance bottom of the drain voltage VVD, a circuit that detects an induced voltage bottom of the auxiliary winding Nb of the transformer 13 may be provided. For example, see JP 2020-58166 describing the induced voltage bottom detecting circuit of the auxiliary winding.

The turn-off trigger generating circuit 42 includes a comparator that compares the voltage VCS of the current detecting terminal CS with the feedback voltage VFB. In the stage that follows, a mask circuit 47 is provided. The mask circuit 47 includes a logic gate such as an AND gate in order to cut the turn-off signal transmitted to the latch circuit 43 for a predetermined amount of time (minimum on time) from the turn-on of the switching transistor SW1 according to a signal MSK from the timer circuit 45.

Further, according to the present embodiment, the output of the comparator in the turn-off trigger generating circuit 42 is supplied to the active clamp control circuit 46. In a situation that there is a pulsed signal SPD from the turn-off trigger generating circuit 42 within a predetermined amount of time from turn-on of the transistor SW 1, the active clamp control circuit 46 determines that the drain voltage is not decreased to zero voltage and the zero voltage switching control is not performed. In a situation that there is no pulsed signal SPD within a predetermined amount of time, the active clamp control circuit 46 determines that the zero voltage switching control is performed. Therefore, the active clamp control circuit 46 can easily determine whether the ZVS control is performed.

When the active clamp control circuit 46 determines that the zero voltage switching control is not performed based on the output from the turn-off trigger generating circuit 42, on time of the gate driving signal VG_AC of the transistor MAC can be extended for a predetermined amount of time Δt. This function and the effect of such function is described in detail later.

In order to implement the above function, the timer circuit 45 includes, a first timer (timer 1) 45A that counts minimum on time MOT, a second timer (timer 2) 45B that counts extended amount of time of the MAC being on, and a counter 45C that counts the pulsed spike detecting signal SPD output from the comparator in the turn-off trigger generating circuit 42. The timers 1 and 2 can be configured as an analog timer with a capacitive element and a constant current source (resistor) for charging the capacitive element, a discharging switch (transistor), an invertor or a comparator.

The counter 45C counts up when the spike detecting signal SPD is input continuously and the second timer (timer 2) 45B counts the extended time according to the value of the counter 45C. That is, when the spike detecting signal SPD is input continuously, the extended time is increased in steps. When the spike detecting signal SPD is not input continuously, the counter 45C maintains the value of the counter 45C.

Alternatively, the counter 45C may be omitted and the on time of the MAC may be extended for a same amount of time each time the spike detecting signal SPD is continuously input. When the spike detecting signal SPD is not input continuously, the counter 45C may count down.

The timer circuit 45 shown in FIG. 2 is described for ease of description of the present embodiment, and this does not mean that timers other than the timers 45A and 45B are not provided in the power supply control IC 14. The other circuit blocks may be provided with timers. For example, the timer 45A may be provided in the turn-on trigger generating circuit 41, and the timer 45B, the counter 45C or any other timer may be provided in the active clamp control circuit 46.

Hereinbelow, the specific function and operation of each functional block in the power supply control IC 14 is described. Here, after the basic function and operation of the active clamp control circuit 46 is described with reference to FIG. 3, the linked operation of the turn-on trigger generating circuit 41, the turn-off trigger generating circuit 42, and the active clamp control circuit 46 are described.

Figure 3:
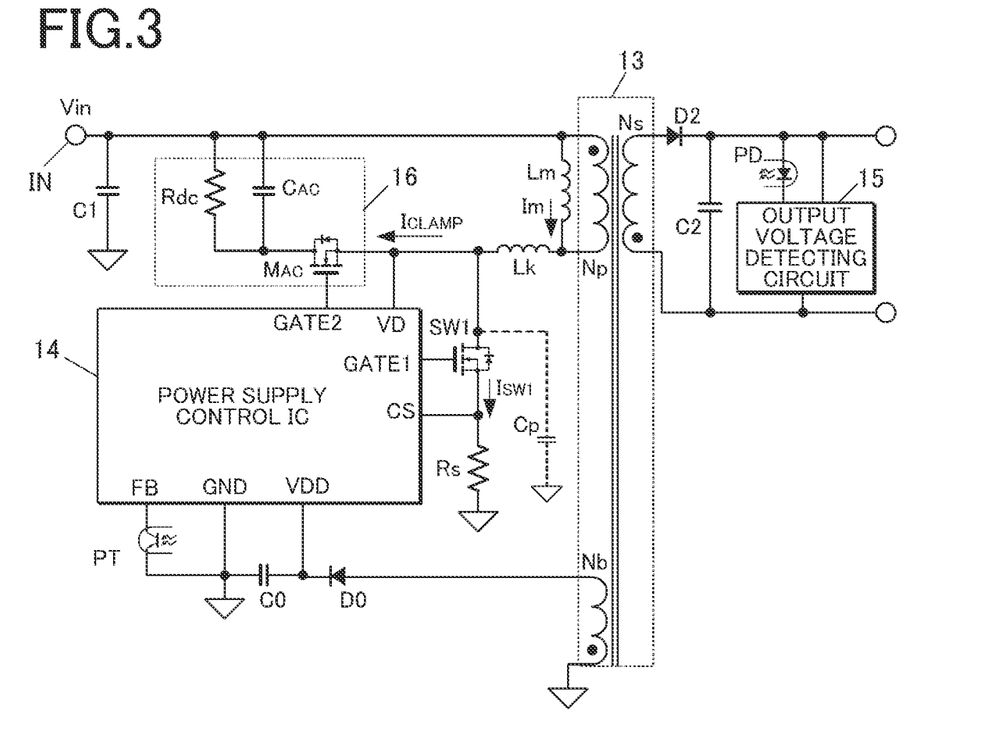
FIG. 3 is a circuit configuration diagram showing an equivalent circuit of a DC-DC convertor portion of the AC-DC convertor shown in FIG. 1.

FIG. 3 shows an equivalent circuit of the DC-DC convertor portion of the insulated power supply apparatus according to the present embodiment shown in FIG. 1. In FIG. 3, Cp shows parasitic capacitance in the drain terminal of the switching transistor SW1, Lm shows excitation inductance of the transformer 13, and Lk shows parasitic inductance on the primary side of the transformer 13.

In the DC-DC convertor shown in FIG. 3, when the switching transistor SW1 is switched on, input voltage Vin is applied to the primary side winding Np of the transformer 13 and excitation current flows. The on of the switching transistor SW1 may be on with the ZVS control, or a typical on condition of the fly back power supply may be the trigger, for example, forced turn-on after starting, bottom detection of the auxiliary winding, and time out during burst. The transistor SW1 in the on state is turned off when the voltage VCS of the current detecting terminal CS reaches the voltage VFB. When the SW1 is off, the decrease of the drain current ISW1 and the increase of the drain voltage VVD begin simultaneously, and since there is a crossing term between the above, ZVS does not occur.

Then, when the transistor SW1 is turned off, the energy accumulated on the primary side winding Np side of the transformer 13 is discharged to the secondary side. When the dISW1/dt suddenly changes, the voltage of the transformer 13 is inverted, the drain parasitic capacitance Cp of the transistor SW1 is charged and the drain voltage VVD of the transistor SW1 increases.

When the drain voltage VVD of the SW1 increases, and becomes higher than the drain side voltage of the transistor MAC of the active clamp circuit 16, a body diode of the MAC is conducted. The MAC is turned on after conducting the body diode. The drain-source voltage VDS of the MAC is forward direction voltage Vf (≅1V) of the diode and this can be considered to be substantially the ZVS. A resonance circuit is formed in the parasitic inductance Lk on the primary side of the transformer 13 and the capacitor CAC of the active clamp circuit 16, and the energy of the Lk is regenerated on the CAC side.

Figure 7:
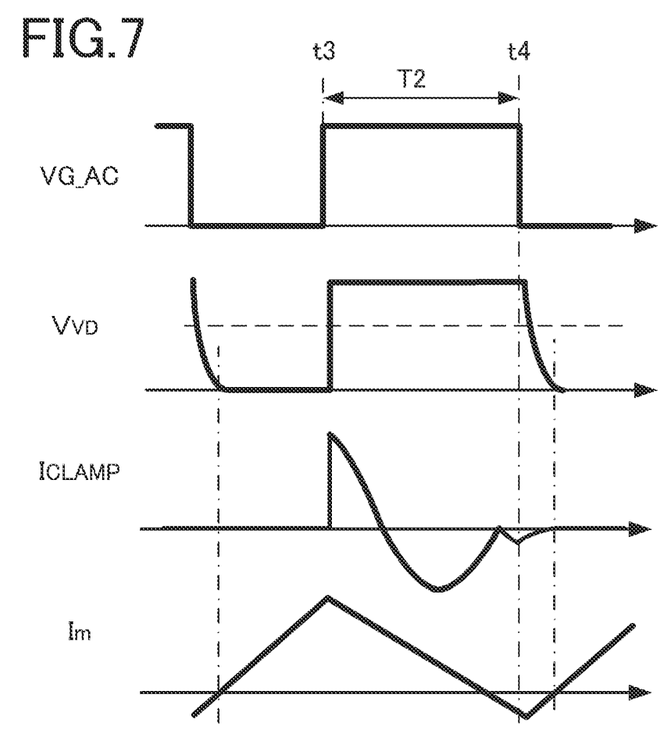
FIG. 7 is a timing chart showing a change in drain voltage, clamp current and current of an excitation inductor in the DC-DC convertor shown in FIG. 3.

With the inverting of the voltage of the transformer 13, the current Im of the excitation inductance Lm changes to a negative slope as shown in FIG. 7. The slope in this case is −(Np/Ns)*Vout/Lm. The active clamp circuit 46 switches off the MAC when the Im is minus. The longer the on time of the MAC becomes, the larger the minus side amplitude of the Im becomes. By switching off the MAC when the Lm is minus, the current becomes a direction to discharge the parasitic capacitance Cp of the drain of the SW1. Then, by switching on the SW1 when the Cp is discharged to zero volts, reduction of switching loss by ZVS can be achieved. As described above, the transistor SW1 in the on state is turned off when the voltage VCS of the current detecting terminal CS reaches the voltage VFB, and the operation is repeated.

However, when the minus amplitude of the Im is insufficient, the Cp cannot be discharged to zero volt, and the charge accumulated in the drain parasitic capacitance Cp of the transistor SW1 is discharged to the grounding point side through the SW1 when the transistor SW1 is switched to on. The discharged charge amount is in proportion with the drain voltage VVD of the transistor SW1. The discharged charge amount becomes larger as the ZVS control is shifted from the optimal timing. When surge current due to the discharge becomes large, as shown in FIG. 4B, spike SP occurs in the voltage VCS of the current detecting terminal CS of the power supply control IC 14.

Therefore, as shown in FIG. 2, when the turn-off trigger generating circuit 42 of the power supply control IC 14 generates the turn-off signal of the transistor SW1 based on the voltage VCS of the current detecting terminal CS, there may be noise in the output of the comparator in the turn-off trigger generating circuit 42 due to the spike SP. Therefore, as described above, the mask circuit 47 is provided in the stage later than the turn-off trigger generating circuit 42 in order to remove the noise caused by detecting the spike SP. With this, the transistor SW1 is not switched off erroneously.

Figure 4A:
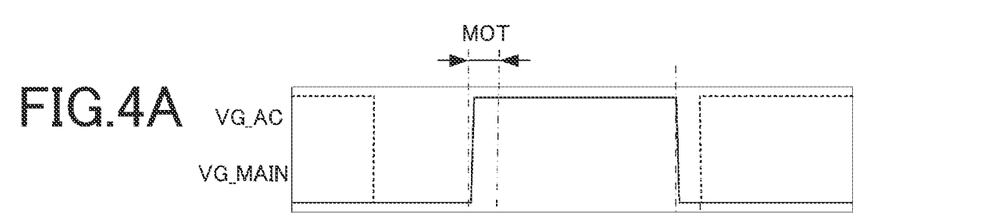
FIG. 4A to FIG. 4C each show a waveform diagram showing a signal waveform of each portion of the power supply control semiconductor device shown in FIG. 3.
Figure 4B:
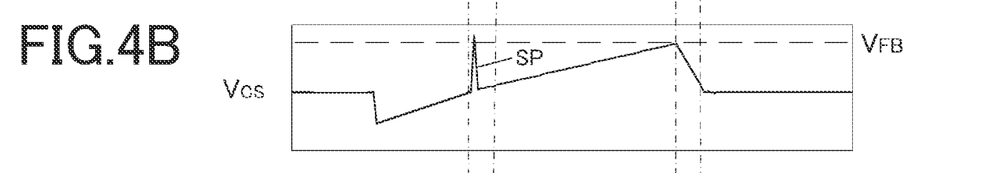
Figure 4C:
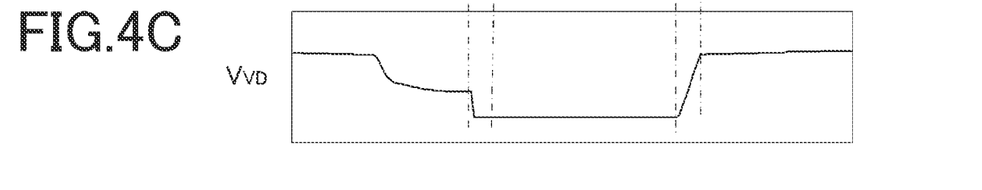

That is, as shown in FIG. 4B, in a situation that the spike SP occurs in the voltage VCS of the current detecting terminal CS, as shown in FIG. 4C, since the drain voltage VVD is not zero when the transistor SW1 is turned on, the ZVS control is not performed. In such situation, the timing that the turn-on timing detecting circuit 41A responds may be shifted from zero of the drain voltage VVD or may occur when the transistor SW1 is turned on by the resonance bottom detecting circuit 41B in the turn-on trigger generating circuit 41. The resonance bottom detecting circuit 41B detects the resonance bottom of the drain voltage VVD of the transistor SW1 and generates the turn-off signal. The drain voltage VVD when the SW1 is on does not become zero and the switching loss occurs.

In the power supply control IC 14 according to the present embodiment, as described above, the active clamp control circuit 46 is configured so that the on-time of the gate driving signal VG_AC of the transistor MAC is extended a predetermined amount of time according to the signal (SPD) from the turn-off trigger generating circuit 42. That is, the active clamp control circuit 46 is configured to include the ZVS determining function that determines whether the ZVS control is performed or not, and the function to generate the gate driving signal VG_AC so that the on-time of the MAC is extended a predetermined amount of time in a situation the ZVS control is not performed.

Below, the reason and the advantages of extending the on-time of the gate driving signal VG_AC are described with reference to the timing chart shown in FIG. 5A to FIG. 5E and FIG. 6A to FIG. 6E. FIG. 5A to FIG. 5E are diagrams showing a situation in which the power supply control IC 14 is performing the ZVS (zero voltage switching) control, and FIG. 6A to FIG. 6E are diagrams showing a situation in which the power supply control IC 14 is not performing the ZVS control.

In a situation in which the power supply control IC 14 is performing the ZVS control, as shown in FIG. 5A to FIG. 5E, at a timing t1 in which the turn-on timing detecting circuit 41A detects that the drain voltage VVD of the switching transistor SW1 (hereinafter referred to as main switch) becomes zero, the gate driving signal VG_MAIN of the main switch SW1 changes from the low level to the high level and the SW1 switches to on. With this, the current ISW1 flows.

Figure 5A:
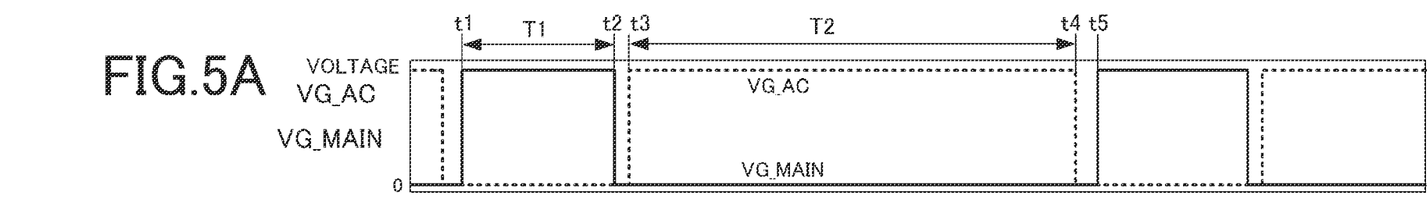
FIG. 5A to FIG. 5E are timing charts showing change in voltage and current of each unit of the DC-DC convertor shown in FIG. 3 in a situation that ZVS control is performed.
Figure 5B:
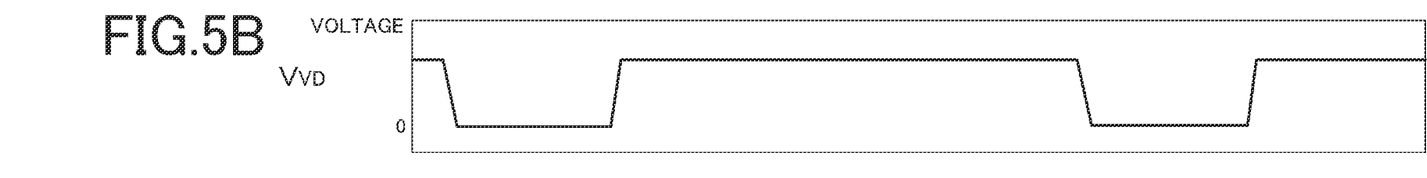
Figure 5C:
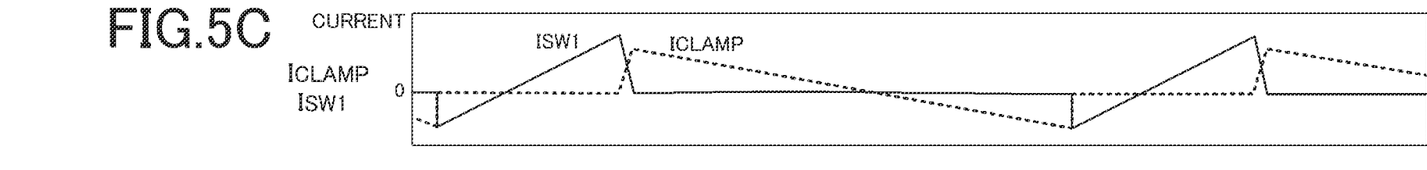
Figure 5D:
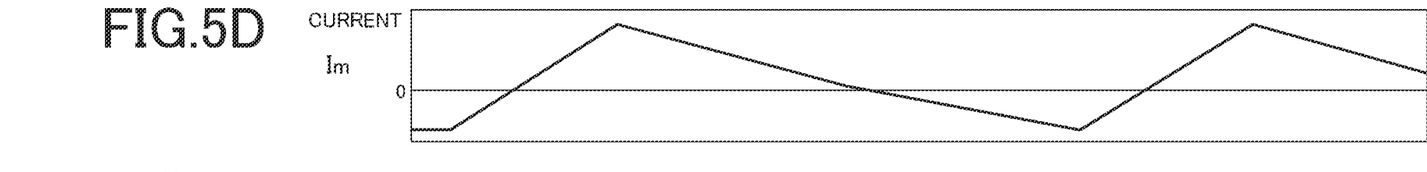
Figure 5E:
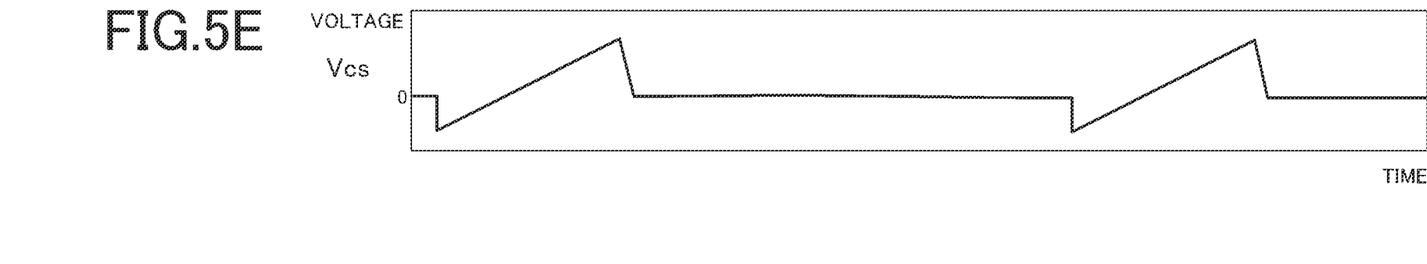

Then, in the term T1 in which the SW1 is on, as shown in FIG. 5C and FIG. 5E, the drain voltage ISW1 and the voltage VCS of the current detecting terminal CS increase linearly. Then, at the timing t2 in which the turn-off trigger generating circuit 42 detects that the voltage VCS of the terminal CS reaches the voltage VFB as the reference voltage, the gate driving signal VG_MAIN of the main switch SW1 changes from high level to low level and the SW1 switches to off. Then, although the current ISW1 drastically decreases, the drain parasitic capacitance Cp of SW1 is charged by the current Im of the excitation inductor of the transformer, and the drain voltage VVD rises rapidly.

Then, when the drain voltage VVD becomes higher than a sum of the input voltage Vin and the voltage VCLAMP of the capacitor CAC of the active clamp circuit 16 (Vin+ VCLAMP), the body diode of the active clamp transistor MAC is conducted and the source-drain voltage of the MAC becomes substantially zero. At this timing t3, the gate driving signal VG_AC of the transistor MAC changes from low level to high level, and the MAC is switched to on. With this, the current ICLAMP starts to flow from the MAC source side to the drain side. Then, the flow gradually decreases and the direction of the current is reversed in the middle of the process and the current (−) increases in the direction in the opposite direction (from drain side to source side) (term T2). By controlling the transistor MAC at the above timing, the switching loss of the MAC can be reduced.

Then, according to the signal from the timer that is not shown, the gate driving signal VG_AC of the MAC changes from high level to low level at a timing t4 which is when a predetermined amount of time T2 elapses from a timing t3, and the MAC is switched off. Then, the drain voltage VVD of the main switch SW1 rapidly falls and becomes zero (timing t5). The above operation is repeated and the normal ZVS control is performed.

As shown in FIG. 5D, similar to the drain current ISW1 of the SW1, the current Im of the excitation inductor of the transistor changes from increase to decrease near the timing t2 and changes from decrease to increase near the timing t4. Here, the current Im of the excitation inductor (input current on the primary side of the transformer+current on the secondary side/winding ratio of transformer) can be calculated. Once the current Im of the excitation inductor is obtained, the off term T2 of the transistor MAC can be calculated and the timing t4 can be determined.

In a situation in which the power supply control IC 14 does not perform ZVS control, as shown in FIG. 6A to FIG. 6E, the drain voltage VVD of the main switch SW1 does not decrease to zero and therefore the turn-on timing detecting circuit 41A cannot detect the zero voltage of the VVD. Instead, at the timing t1 that the resonance bottom detecting circuit 41B detects the resonance bottom of the VVD, the gate driving signal VG_MAIN of the main switch SW1 changes from the low level to the high level, and the SW1 switches to on. With this, the current flows.

Here, since VVD is not zero, charge remains in the drain parasitic capacitance Cp of the main switch SW1. The charge flows through the SW1 and is discharged, causing the surge current to flow. Then, the spike SP occurs in the voltage VCS of the current detecting terminal CS.

Then, the comparator in the turn-off trigger generating circuit 42 detects the spike SP and noise occurs in the output. As described above, since the output of the comparator is masked by the mask circuit 47 in the later stage during the minimum on time MOT (see FIG. 4), it is possible to prevent the turn-off signal being supplied to the latch circuit 43 by mistake.

As it is possible to understand by comparing FIG. 6A to FIG. 6E with FIG. 5A to FIG. 5E, other than detecting the VVD resonance bottom and switching on the SW1, the situation of performing the ZVS control and the situation of not performing the ZVS control are the same. However, in the situation in which the ZVS control is not performed, as described above, in response to the comparator in the turn-off trigger generating circuit 42 detecting the spike SP, the term T2 that the gate driving signal VG_AC of the transistor MAC output from the active clamp control circuit 46 is high level is extended Δt from the timing t4 as shown with a broken line B in FIG. 6A. With this, the on time of the transistor MAC is extended Δt.

Figure 6A:
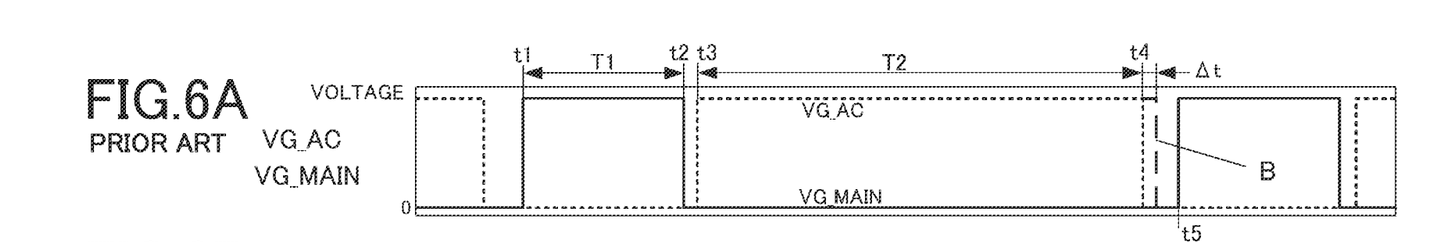
FIG. 6A to FIG. 6E are timing charts showing change in voltage and current of each unit of the DC-DC convertor shown in FIG. 3 in a situation that ZVS control is performed.
Figure 6B:
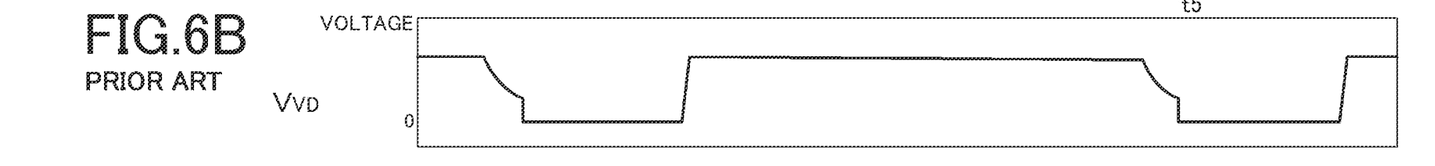
Figure 6C:
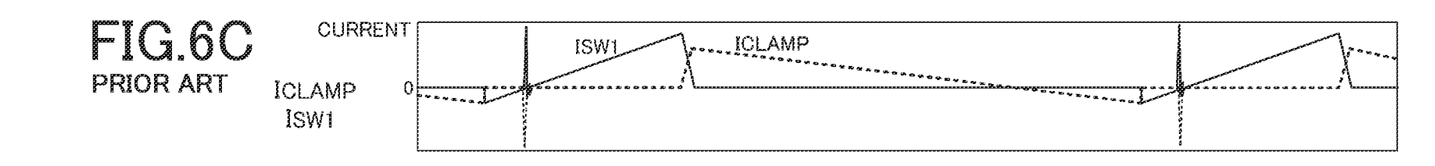
Figure 6D:
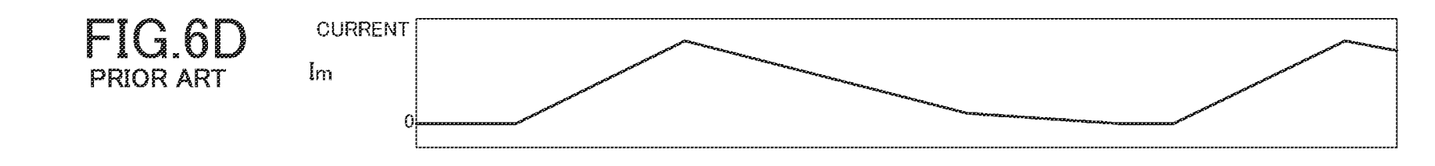
Figure 6E:
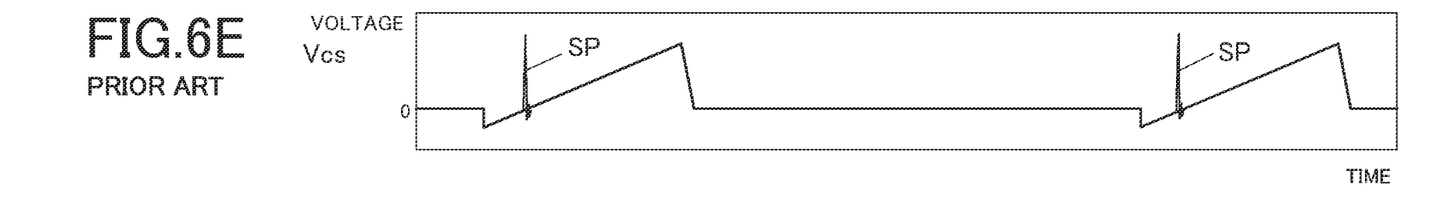

As a result, the drain voltage VVD of the main switch SW1 becomes closer to zero. Then, when the spike SP is generated in the voltage VCS again in the next cycle, the on time of the transistor MAC is further extended. By repeating the above, the drain voltage VVD of the SW1 becomes zero, and the ZVS control is achieved.

Next, the effect of the on time of the active clamp transistor MAC extending is described using the diagram of the waveform shown in FIG. 7.

FIG. 7 shows the change in the gate driving signal VG_AC of the transistor MAC when the active clamp circuit 16 is operated and the ZVS control is performed, the drain voltage VDD of the main switch SW1, the clamp current ICLAMP (see FIG. 3) flowing by the active clamp circuit 16, and the current Im flowing in the excitation inductor Lm of the transformer 13.

As shown in FIG. 7, while the active clamp transistor MAC is switched to on (term T2), the current Im of the inductor Lm linearly decreases. When the gate driving signal VG_AC of the transistor MAC changes from high level to low level at the timing t4 and the MAC is switched to off, the path of the current switches to the main switch SW1 side and the drain voltage VVD of the main switch SW1 falls rapidly. The current Im of the inductor Lm changes in the negative direction right before the timing t4, and changes to a positive slope when the MAC is switched to off.

Here, in order to perform zero voltage switching (ZVS) of the main switch SW1, the current to discharge the capacitance between terminals of the transistor MAC is necessary when the active clamp transistor MAC is turned off, and such condition is satisfied in a situation that the current Im of the excitation inductor is negative. Therefore, it is necessary for the Im to decrease to minus (negative). The amplitude of the negative side of the current Im is increased and the bottom of the current Im is spread to the negative side. As a result, the bottom value of the current Im becomes smaller than 0.

Consequently, as in the power supply control IC of the above embodiment, by extending the on time of the active clamp transistor MAC in a situation that the ZVS control is not achieved, the ZVS control can be achieved more easily.

Specifically, the slope of the falling edge of the current Im of the excitation inductor Lm can be calculated by the ratio N of the winding of the transformer 13, the output voltage Vout and the excitation inductance Lm using the formula −N×Vout/Lm. With this, it is possible to calculate the time until the current Im becomes negative using the calculated slope and the peak value of the current Im. By setting the calculated time as the initial value of the on term of the MAC and extending the on time of the MAC in response to detecting the drain current surge, that is, the spike of the voltage VCS of the current detecting terminal CS, it is possible to achieve ZVS control. When the bottom of the current Im is spread too much to the negative side, the efficiency decreases. Therefore, it is preferable to spread the bottom of the current Im to a point where ZVS control can just barely be performed. Therefore, as described above, when the spike is detected, the on-time of the MAC should be extended stepwise little by little.

According to the present invention, it is possible to easily determine whether the ZVS control is performed in the insulated power supply apparatus that is provided with the active clamp circuit and that employs the zero voltage switching control method without directly monitoring the drain voltage. Therefore, in a situation that the ZVS control is not performed, by extending the on time of the active clamp transistor, it is possible to reduce the noise that occurs when the switching element is turned on. Moreover, it is possible to reduce the unnecessary energy loss and to enhance the conversion efficiency of the power supply apparatus.

Second Example

Next, the second example of the power supply control IC 14 is described with reference to FIG. 8.

Figure 8:
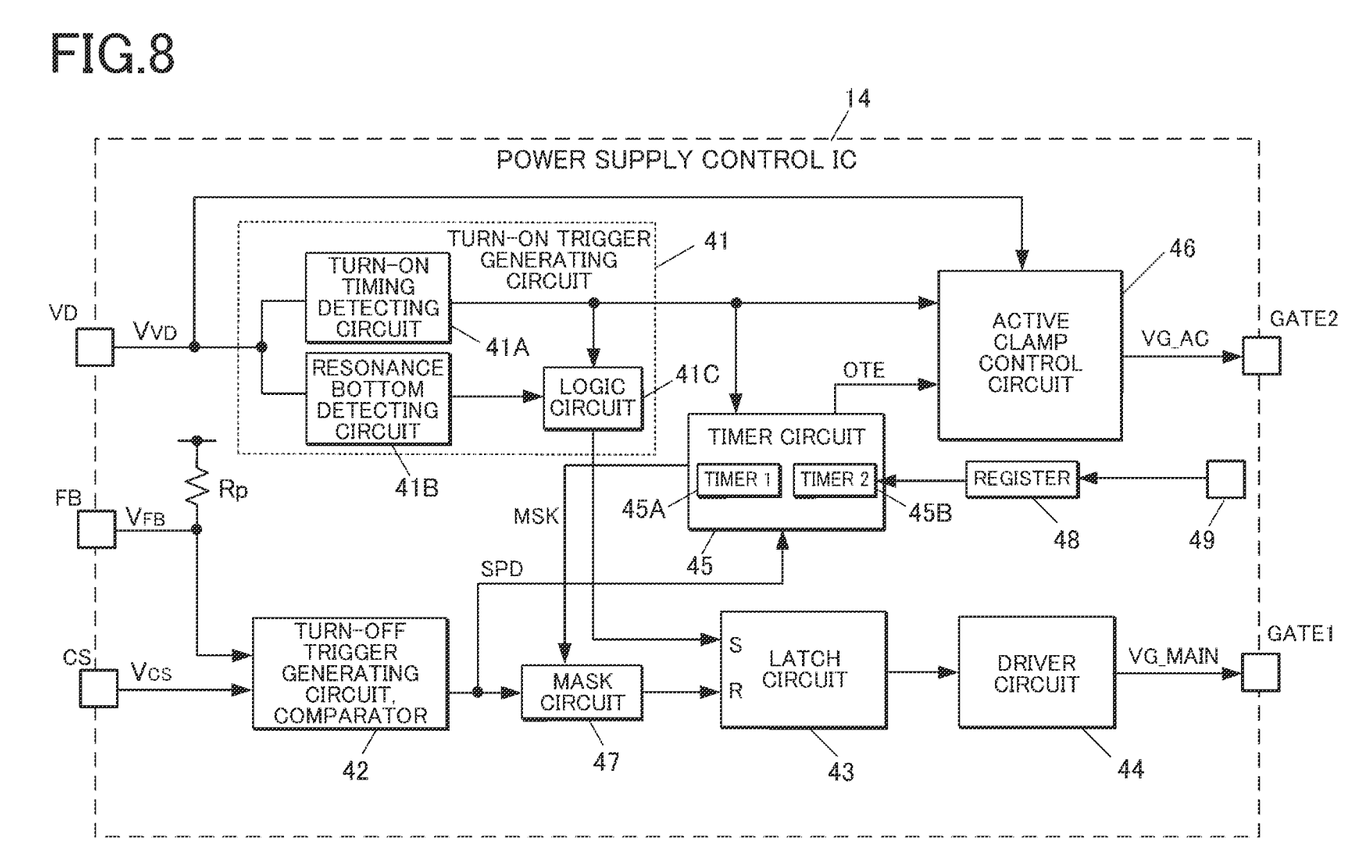
FIG. 8 is a circuit configuration diagram showing a second embodiment of the power supply control semiconductor device.

In the power supply control IC 14 of the second example as shown in FIG. 8, the counter 45C of the timer circuit 45 described in the first example is omitted. Moreover, a register 48 in which counted time counted by the second timer 45B is set and a terminal 49 to input by serial transmission a value (binary code) set in the register 48 are provided in the power supply control IC 14 of the second example. When an analog timer is used, the resistor that determines the current value is switched according to the set value in the register 48.

The terminal 49 can be provided as the external terminal of the IC or may be provided as an on-chip pad. The register 48 may be a nonvolatile memory element such as an EEPROM element. The register 48 may be configured so that the set value can be input by parallel transmission.

As described above, by providing the register 48, the following advantages are achieved, that is, it is possible to change the setting of the time counted by the timer, and there is no need for an external resistance to change the counted time.

According to this example also, in a situation that it is determined that the zero voltage switching control is not performed, the active clamp control circuit 46 may extend the on time of the transistor MAC included in the active clamp circuit in a predetermined amount set in the register 48. When it is continuously determined that the zero voltage switching control is not performed in a plurality of cycles, the on time of the transistor MAC may be extended stepwise a predetermined amount set in the register 48 at a time.

The present invention conceived by the inventors is described in detail on the basis of the embodiments, but the present invention is not limited to the embodiments described above. For example, according to the above embodiment, the switching transistor SW1 is an element separate from the power supply control IC 14. However, the switching transistor SW may be incorporated in the power supply control IC 14 so as to be one semiconductor integrated circuit. According to the above embodiments, the diode rectifying type circuit is used as the secondary side circuit but a synchronous rectifying circuit can be used.

According to the present embodiment, the active clamp circuit 16 includes the transistor MAC, the capacitor CAC and the resistor Rdc, but in addition to the above elements, a passive clamp circuit including a diode, a resistor, and a capacitor may be provided.

Further, the present embodiment is described as an example in which the present invention is applied to an AC-DC comparator. However, the present invention can be applied to a DC-DC convertor omitting the diode bridge circuit 12.

What is claimed is:

1. An insulated power supply apparatus comprising:
   a transformer that converts voltage;
   a switching element connected in series with a primary side winding of the transformer;
   an active clamp circuit connected between terminals of the primary side winding of the transformer; and
   a power supply control semiconductor device that controls the switching element and the active clamp circuit,
   wherein the switching element includes a field effect transistor and a current-voltage conversion element is connected between a source terminal of the switching element and a grounding point, and
   wherein the power supply control semiconductor device includes:
      a first external terminal in which a voltage according to a drain side of the switching element or a voltage dividing the voltage according to the drain side of the switching element is input,
      a second external terminal in which a voltage converted by the current-voltage conversion element is input,
      an on/off control circuit that performs turn-on and turn-off of the switching element based on an input voltage of the first external terminal, and
      a ZVS determining circuit that determines whether a zero voltage switching control is performed by determining a drain side voltage of the switching element is a zero voltage based on the input voltage of the second external terminal.

2. The insulated power supply apparatus according to claim 1,
   wherein the on/off control circuit includes a turn-on timing detecting circuit that detects a turn-on timing of the switching element based on the input voltage of the first external terminal and a turn-off timing detecting circuit that detects a turn-off timing of the switching element by comparing the input voltage of the second external terminal with a predetermined reference voltage, and
   wherein the ZVS determining circuit determines that the zero voltage switching control is not performed in a situation that there is an output of the turn-off timing detecting circuit within a predetermined amount of time right after the timing of turn-on is detected by the turn-on timing detecting circuit, and determines that the zero voltage switching control is performed in a situation that there is no output of the turn-off timing detecting circuit within the predetermined amount of time.

3. The insulated power supply apparatus according to claim 1, further comprising a signal generating circuit that generates a control signal that controls the active clamp circuit,
   wherein the signal generating circuit extends an on time of a transistor included in the active clamp circuit with a predetermined amount in a situation that the ZVS determining circuit determines that the zero voltage switching control is not performed.

4. The insulated power supply apparatus according to claim 1, further comprising a signal generating circuit that generates a control signal that controls the active clamp circuit, and
   wherein the signal generating circuit stepwise extends an on time of a transistor included in the active clamp circuit in a situation that the ZVS determining circuit continuously determines that the zero voltage switching control is not performed in a plurality of continuous cycles.

5. The insulated power supply apparatus according to claim 3, wherein the signal generating circuit maintains an on time of the transistor included in the active clamp circuit to be a same of the on time as the previous cycle in a situation that the ZVS determining circuit determines that the zero voltage switching control is performed.

6. The insulated power supply apparatus according to claim 2,
   wherein the on/off control circuit includes:
      a driving signal generating circuit that generates a gate driving signal of the switching element based on an output of the turn-on timing detecting circuit and an output of the turn-off timing detecting circuit,
      a mask circuit that cuts transmitting of the output of the turn-off timing detecting circuit to the driving signal generating circuit for a predetermined amount of time right after the turn-on timing detecting circuit detects the turn-on timing, and
      a timer circuit that counts the predetermined amount of time,
      wherein the timer circuit starts a time counting operation in response to the turn-on timing detecting circuit detecting the turn-on timing, stops the time counting operation at a point that a preset predetermined amount of time is counted, and outputs a signal showing that the time is being counted while the time is being counted, and
      wherein the mask circuit cuts the output of the turn-off timing detecting circuit while the timer circuit outputs the signal showing that the time is being counted.

* * * * *